(12) United States Patent
Hattori

(10) Patent No.: US 8,417,056 B2
(45) Date of Patent: Apr. 9, 2013

(54) IMAGE PROCESSING APPARATUS AND IMAGE PROCESSING METHOD

(75) Inventor: Mitsuaki Hattori, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 477 days.

(21) Appl. No.: 12/466,294

(22) Filed: May 14, 2009

(65) Prior Publication Data

US 2009/0297060 A1    Dec. 3, 2009

(30) Foreign Application Priority Data

Jun. 2, 2008   (JP) ................... 2008-144551

(51) Int. Cl.
- G06K 9/20    (2006.01)
- G06K 9/32    (2006.01)
- G06K 9/36    (2006.01)
- G06K 9/40    (2006.01)

(52) U.S. Cl. ........ 382/275; 382/282; 382/286; 382/296; 382/298

(58) Field of Classification Search ........... 382/275, 382/282, 286, 298
See application file for complete search history.

(56) References Cited

U.S. PATENT DOCUMENTS

| | | | | |
|---|---|---|---|---|
| 5,960,126 A | * | 9/1999 | Nielsen et al. | 382/298 |
| 6,154,755 A | * | 11/2000 | Dellert et al. | 715/202 |
| 6,801,334 B1 | * | 10/2004 | Enomoto | 358/1.18 |
| 6,883,140 B1 | * | 4/2005 | Acker et al. | 715/730 |
| 6,906,746 B2 | * | 6/2005 | Hijishiri et al. | 348/240.2 |
| 7,035,478 B2 | * | 4/2006 | Crandall et al. | 382/284 |
| 7,305,146 B2 | * | 12/2007 | Cheatle | 382/296 |
| 7,881,563 B2 | * | 2/2011 | Mandy et al. | 382/300 |
| 8,068,162 B2 | * | 11/2011 | Fredlund et al. | 348/333.11 |
| 8,155,398 B2 | * | 4/2012 | Togashi | 382/118 |
| 2002/0131095 A1 | * | 9/2002 | Koike | 358/516 |
| 2003/0071904 A1 | * | 4/2003 | Karasaki et al. | 348/231.3 |
| 2004/0093432 A1 | * | 5/2004 | Luo et al. | 709/247 |
| 2007/0035790 A1 | * | 2/2007 | Kotani | 358/537 |

FOREIGN PATENT DOCUMENTS

| | | |
|---|---|---|
| JP | 2004-094124 A | 3/2004 |
| JP | 2005-045513 A | 2/2005 |

* cited by examiner

Primary Examiner — Matthew Bella
Assistant Examiner — Jose M Torres
(74) Attorney, Agent, or Firm — Canon USA Inc IP Division

(57) ABSTRACT

An image processing apparatus which includes an image processing unit and a system control unit, wherein this system control unit adds information for determining an image height reference position of an image before cropping processing is performed to an image cropped by the image processing unit, and records the resultant image in an external storage device. Alternatively, information for determining an image height reference position of an image before rotation processing is performed is added to an image rotated by the image processing unit, and the resultant image is recorded in an external storage device.

6 Claims, 14 Drawing Sheets

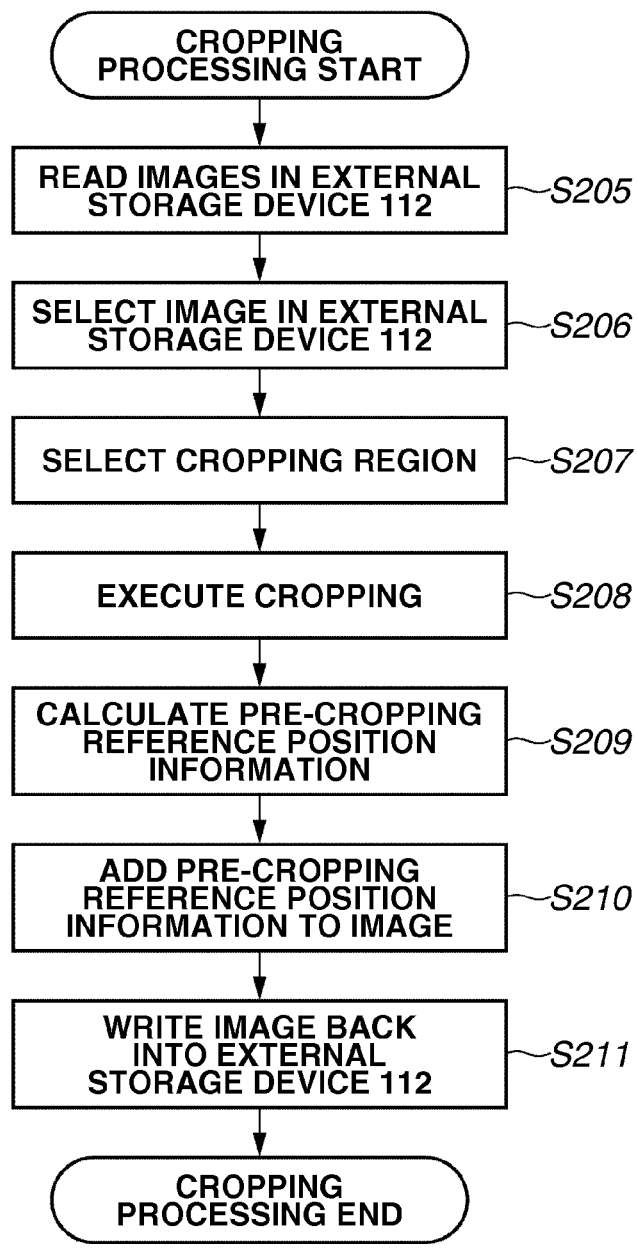

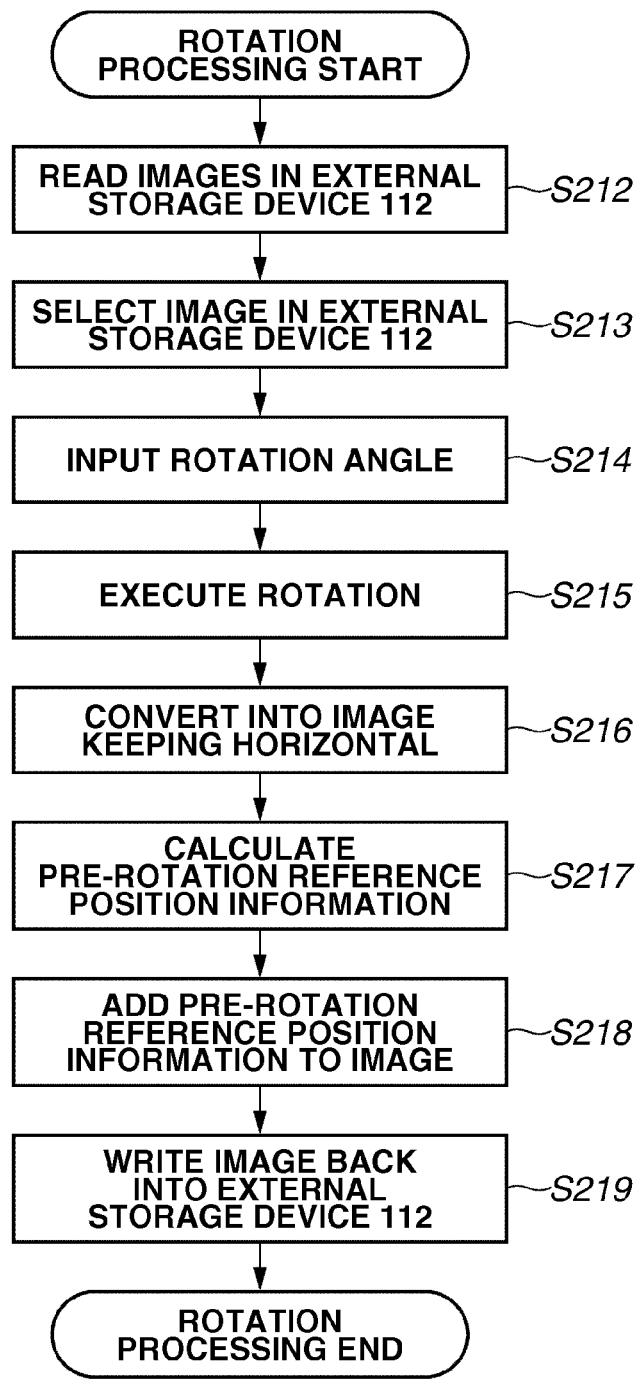

IMAGE PROCESSING APPARATUS AND IMAGE PROCESSING METHOD

BACKGROUND OF THE INVENTION

1. Field of the Invention

The present invention relates to an image processing apparatus having a cropping function for cropping part of a captured image, a rotation function for rotating the image, an optical distortion correction function for correcting optical distortion, and the like, and an image processing method thereof.

2. Description of the Related Art

Conventionally, in an imaging apparatus, optical distortion, such as chromatic aberration and light falloff at edges, can occur on a captured image due to the effects of the imaging optical system. Thus, image processing application software for an imaging apparatus, a personal computer (hereinafter, "PC"), or the like provided with a function for correcting various kinds of optical distortion, such as chromatic aberration and light falloff at edges, is commercially available. For example, as discussed in Japanese Patent Application Laid-Open No. 2004-94124, to correct optical distortion, a correction amount has to be changed according to the image height (in an optical image formed on an image sensor by light passing through a lens, the distance from the point where the light passes through a position which is the center of radially changing optical characteristics of the lens to the target point).

On the other hand, some imaging apparatuses have a cropping function for cropping part of a captured image and an electronic zoom function for cropping and recording a part of the image.

Further, the cropping processing of the image can also be performed by inputting the image captured by the imaging apparatus into a PC via a recording medium and using the application software installed on the PC.

However, in an image which has been subjected to such cropping processing or electronic zoom processing (variable magnification processing), the image height cannot be necessarily the distance from the center of the image. That is, sometimes the center position of the image after the processing (hereinafter, sometimes referred to as "the post-image processing image") differs from the center position of the image before the processing (hereinafter, sometimes referred to as "the pre-image processing image").

Thus, for an image which has once been subjected to cropping processing or electronic zoom processing, sometimes the correct image height cannot be calculated. As a result, it may be impossible to correctly perform the optical distortion correction, such as chromatic aberration and light falloff at edges, when the image is subsequently read.

Further, in addition to the cropping processing or electronic zoom processing, the image captured by the imaging apparatus may also be subjected to rotation processing for adjusting a horizontal position of the captured image. When performing rotation processing, similar to the case described above, in some cases the correct image height cannot be calculated, so that the optical distortion correction cannot be correctly performed when the image is subsequently read.

SUMMARY OF THE INVENTION

The present invention is directed to an image processing apparatus, a control method, and a program, which enable optical distortion correction to be correctly performed even on an image which has been subjected to cropping processing or rotation processing.

According to an aspect of the present invention, an image processing apparatus includes an image processing unit configured to perform cropping processing on a part of an image, and a control unit configured to add and record in an image cropped by the image processing unit information for determining an image height reference position of an image before the cropping processing is performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2B is a flowchart illustrating the cropping processing by the imaging apparatus.

FIG. 2C is a flowchart illustrating the rotation processing by the imaging apparatus.

DETAILED DESCRIPTION OF THE EMBODIMENTS

Figure 1:
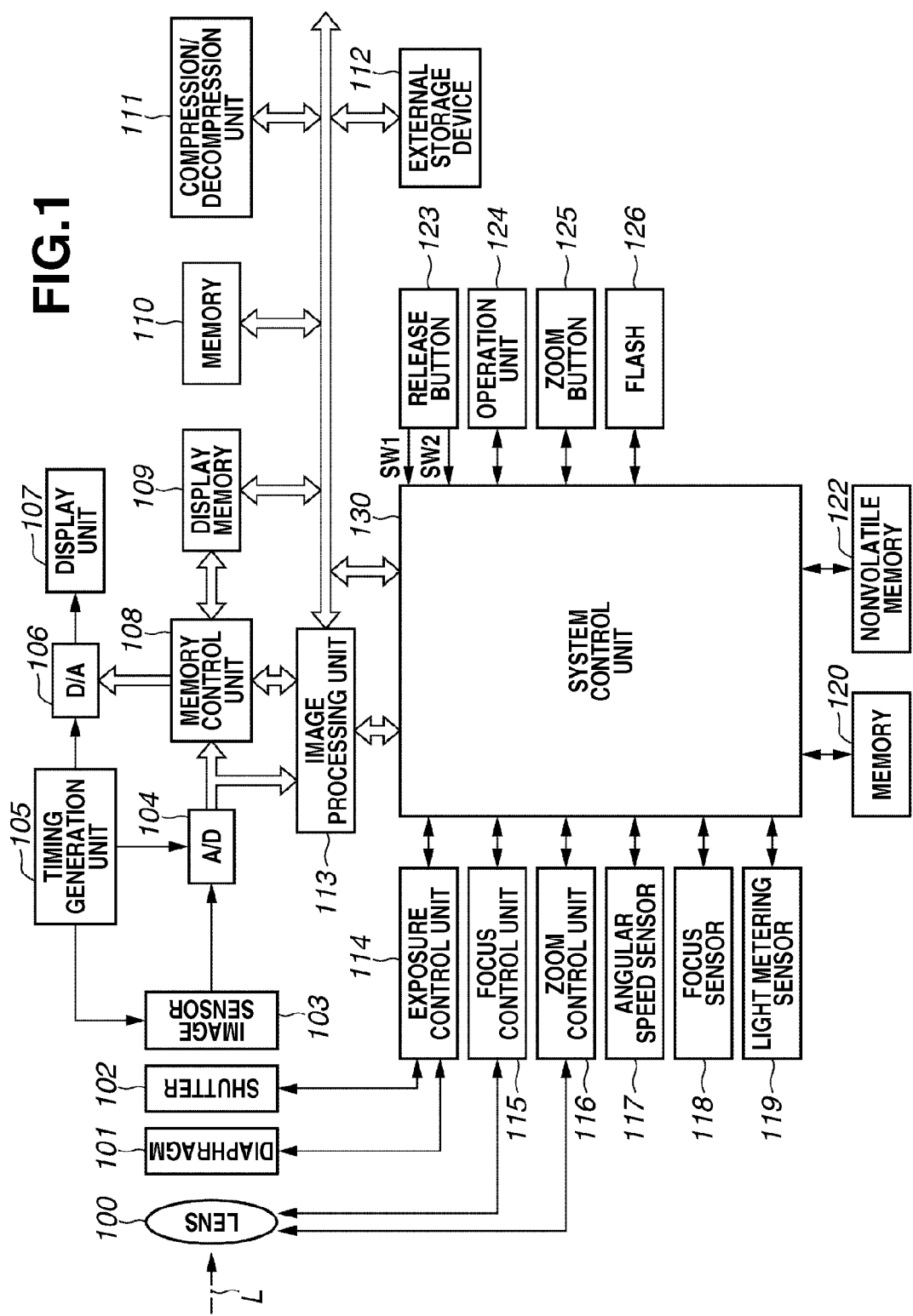
FIG. 1 is a block diagram illustrating a configuration of an imaging apparatus as an image processing apparatus according to an exemplary embodiment of the present invention.

Various exemplary embodiments, features, and aspects of the invention will be described in detail below with reference to the drawings.

An exemplary embodiment of the present invention will now be described in detail referring to the drawings.

FIG. 1 is a block diagram illustrating an example configuration of an imaging apparatus (image processing apparatus) according to an exemplary embodiment of the present invention.

In FIG. 1, the imaging apparatus (e.g., a digital camera) includes an imaging lens 100, a diaphragm 101, a shutter 102, an image sensor 103, an image processing unit 113, a system control unit 130, and the like.

The image sensor 103 includes a color filter (R, G, B). During imaging, an optical image by light L that is incident through the imaging lens 100 is formed on the image sensor 103, and this optical image is converted into an electric signal thereby. An A/D converter 104 converts an analog signal output from the image sensor 103 into a digital signal. A timing generation unit 105 is controlled by a memory control unit 108 and the system control unit 130. The timing generation unit 105 supplies a clock signal and a control signal to the image sensor 103, the A/D converter 104, and a D/A converter 106, and controls the operations of these units.

The image processing unit 113 performs predetermined pixel interpolation processing, color conversion processing, and face detection processing on data output from the A/D converter 104 or from the memory control unit 108. Further, the image processing unit 113 performs predetermined calculation processing using the captured image data, and based on the obtained calculation results, performs "Through The Lens" (TTL) type "Auto White Balance" (AWB) processing and color correction processing.

Further, the image processing unit 113 performs image cropping processing for cropping part of the captured image, image rotation processing for rotating the image by an arbitrary angle around arbitrary coordinates, image variable magnification processing for enlarging/reducing the size of the image, and optical distortion correction processing for correcting optical distortion.

The memory control unit 108 controls the A/D converter 104, the timing generation unit 105, the image processing unit 113, an image display memory 109, the D/A converter 106, a memory 110, and a compression/decompression unit 111. As a result, digital data that is A/D converted by the A/D converter 104 is written in the image display memory 109 or the memory 110 via the image processing unit 113 and the memory control unit 108, or directly via the memory control unit 108.

A display unit 107 includes thin film transistors (TFT) and a liquid crystal display (LCD). The image display memory 109 stores image data to be displayed on the display unit 107. The image data stored in the image display memory 109 is displayed via the D/A converter 106 on the display unit 107.

Further, various menus (e.g., an image processing menu for selecting image cropping processing, image rotation processing, image variable magnification processing, optical distortion correction processing and the like, and a white balance selection menu) for controlling the imaging apparatus are displayed on the display unit 107. The display and selection of these various menus on the display unit 107 are performed by an operation of an operation unit 124 by an operator.

The memory 110 stores captured still image data, and has sufficient storage capacity to store a predetermined amount of the still image data. Further, the memory 110 can be used as a work area of the system control unit 130 and the image processing unit 113.

The compression/decompression unit 111 reads the image data stored in the memory 110 and performs compression processing, or reads compressed image data and performs decompression processing. Then, the compression/decompression unit 111 writes the processed image data into the memory 110.

An external storage device 112 is a storage medium that can be detached from/attached to the imaging apparatus. Such as a Compact Flash® (CF) card and a secure digital (SD) card are used. Image data temporarily recorded in the memory 110 is eventually recorded in the external storage device 112.

A light metering sensor 119 measures the luminance of each pixel which is conjugatively associated with the imaging screen. When an appropriate amount of exposure is calculated by the system control unit 130 based on an output of the light metering sensor 119, the exposure control unit 114 controls the diaphragm 101 and the shutter 102 based on the amount of exposure.

A focus sensor 118 detects distance information of a focusing point which is arbitrarily selected by the operator. A focus control unit 115 controls focusing of the imaging lens 100 based on the output from the focus sensor 118. In addition to the selection by the operator, the focusing point may also be selected automatically, for example, to the nearest object based on the detection by the focus sensor 118 so that the object can be automatically focused.

A zoom control unit 116 detects an amount of zooming (focal length) of the imaging lens 100 operated manually by the operator. Further, when the zooming of the imaging lens 100 is performed automatically by the operator using a zoom button 125, the zoom control unit 116 controls the amount of zooming of the imaging lens 100. An automatic flash unit 126 has an auto focus (AF) auxiliary light projecting function and a flash light amount control function. An angular speed sensor 117 detects vibration of the imaging apparatus in the horizontal and vertical directions. This detection result is used for well-known camera-shake correction processing and for determining portrait photographing/landscape photographing.

The system control unit 130 is responsible for the overall control of the imaging apparatus, and executes the processing illustrated in the respective flowcharts of FIGS. 2A to 2D and 8 based on a program. A memory 120 stores programs, including fixed and variable programs for operation of the system control unit 130, image processing parameters and the like. The memory 120 may also be used as a work memory. A nonvolatile memory 122 is a memory such as an Electrically Erasable and Programmable Read Only Memory (EEPROM), which is capable of electrically erasing and recording data.

A release button 123 and the zoom button 125 are used to give various operation instructions to the system control unit 130. The release button 123 includes two switches (two-stroke switch), which are referred to as SW1 and SW2. SW1 is turned ON by a first stroke of the release button 123, which starts light metering and focusing. SW2 is turned ON by a second stroke of the release button 123, which starts an exposure operation.

Next, the operations of the imaging apparatus according to the present exemplary embodiment having the above-described configuration will be described with reference to the drawings.

First, the image cropping processing (hereinafter, referred to as "cropping processing"), the image rotation processing (hereinafter, referred to as "rotation processing"), and the image variable magnification (zooming) processing (hereinafter, referred to as "variable magnification processing") in the imaging apparatus will be described with reference to the flowcharts in FIGS. 2A to 2D In the optical distortion correction described in the present exemplary embodiment, pixel pitch information indicating the size per pixel (hereinafter, referred to as "pixel pitch") of the image sensor 103 used when capturing the optical distortion correction target image is required. In the present exemplary embodiment, the images captured by the image sensor 103 and recorded in the external storage device 112 are assumed to have such pixel pitch information corresponding to those images recorded therein in advance.

An example of a recording method of the pixel pitch information is to record the pixel pitch information as is in the image. Another method is to record pixel pitch information in advance corresponding to various imaging apparatus models in the apparatus performing the optical distortion correction, and to record only the model information of the imaging apparatus in the image. Then, using the model information recorded in the image, the pixel pitch corresponding to that image is calculated. In addition, information indicating the size of the image sensor in the horizontal and vertical directions and information indicating the pixel number of the image in the horizontal and vertical directions as information for calculating the pixel pitch are recorded, and the pixel pitch is calculated by using that information.

Figure 2A:
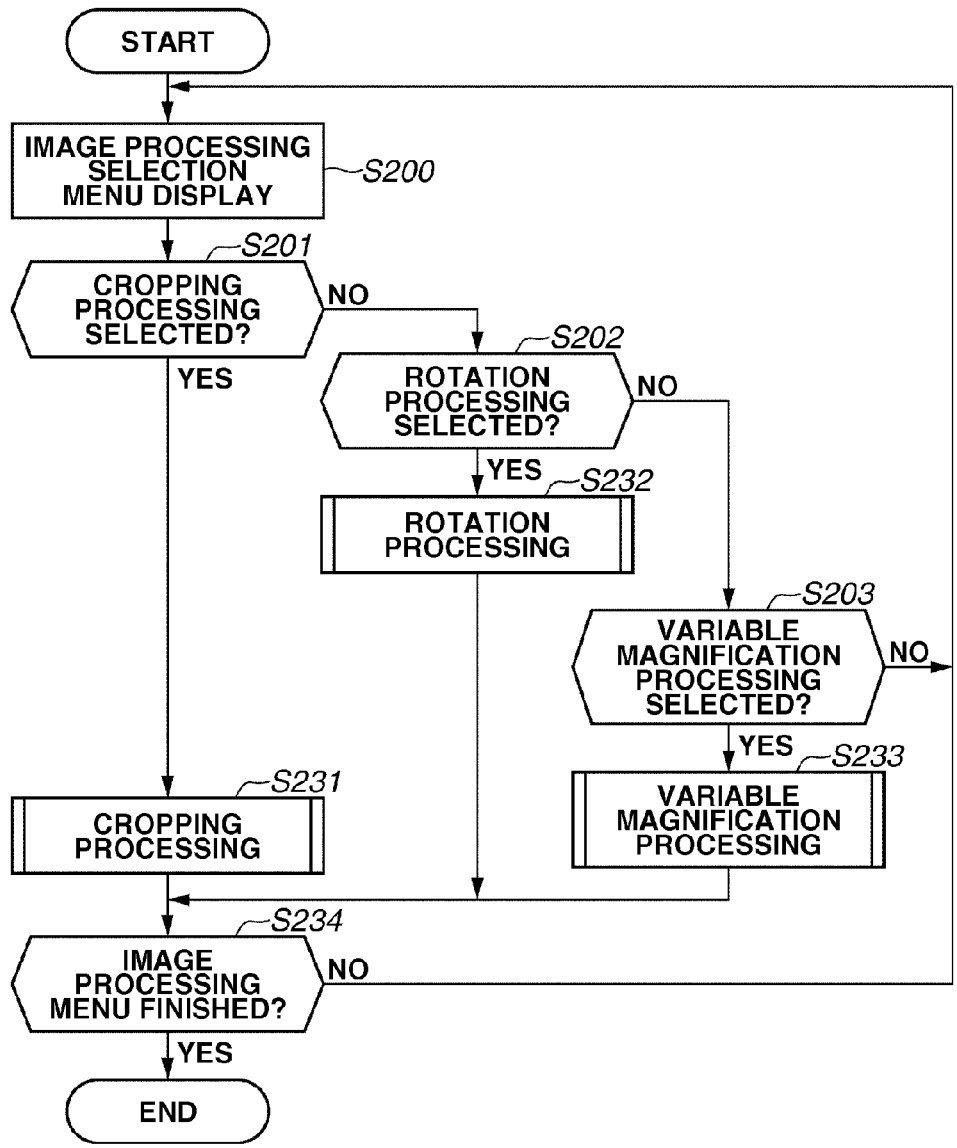
FIG. 2A is a flowchart illustrating cropping processing, rotation processing, and variable magnification processing on an image captured by the imaging apparatus and stored in an external storage device.
Figure 2D:
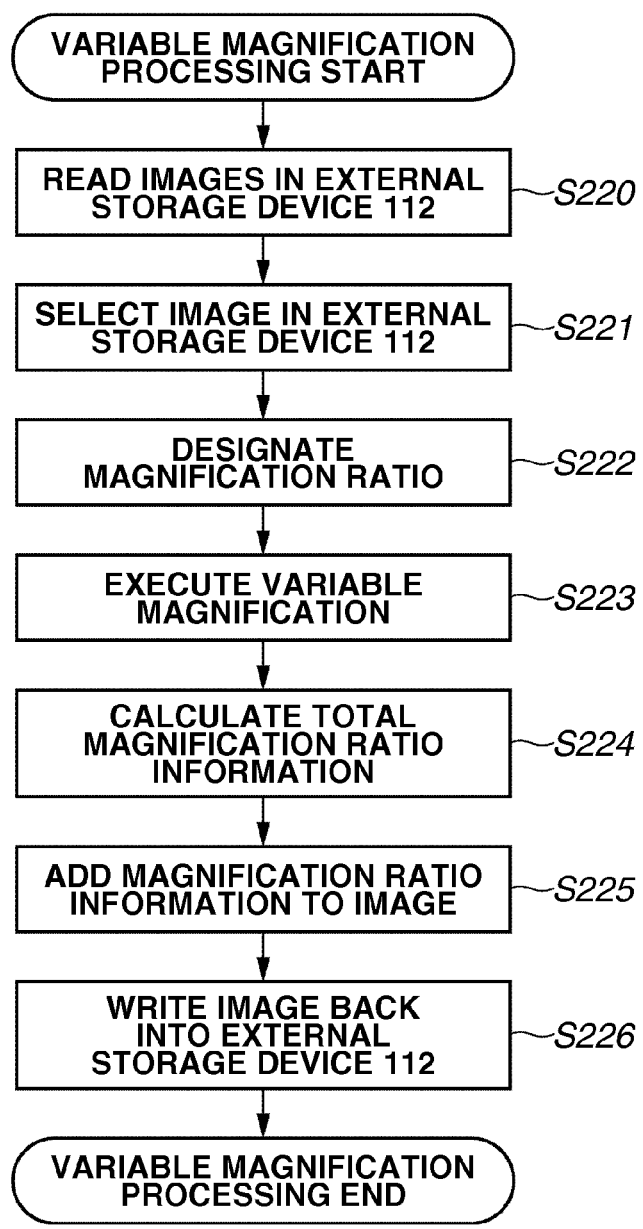
FIG. 2D is a flowchart illustrating the variable magnification processing by the imaging apparatus.

FIG. 2A is a flowchart illustrating the cropping processing, rotation processing, and variable magnification processing on an image captured by the imaging apparatus and stored in the external storage device 112. FIG. 2B is a flowchart illustrating the cropping processing. FIG. 2C is a flowchart illustrating the rotation processing. FIG. 2D is a flowchart illustrating the variable magnification processing.

Referring to FIGS. 2A to 2D, when a user instructs via the operation unit 124 the imaging apparatus to display an image processing selection menu, in step S200, the system control unit 130 displays the image processing selection menu (not-illustrated) on the display unit 107. Using the image processing selection menu, the user can select an arbitrary image processing from among the cropping processing, rotation processing, and variable magnification processing. When the user selects the cropping processing from the image processing selection menu, the system control unit 130 detects the selection of the cropping processing (YES in step S201). In step S231, the image processing unit 113 executes the cropping processing illustrated in FIG. 2B.

In the cropping processing, when the user performs a predetermined operation via the operation unit 124, in step S205, the system control unit 130 successively reads the images recorded in the external storage device 112 into the image display memory 109, and displays each image on the display unit 107. Next, in step S206, when the user selects the cropping processing target image using the operation unit 124, the system control unit 130 detects the selected image. Examples of selectable images include Joint Photographic Experts Group (JPEG) images, RAW images and the like.

Figure 3:
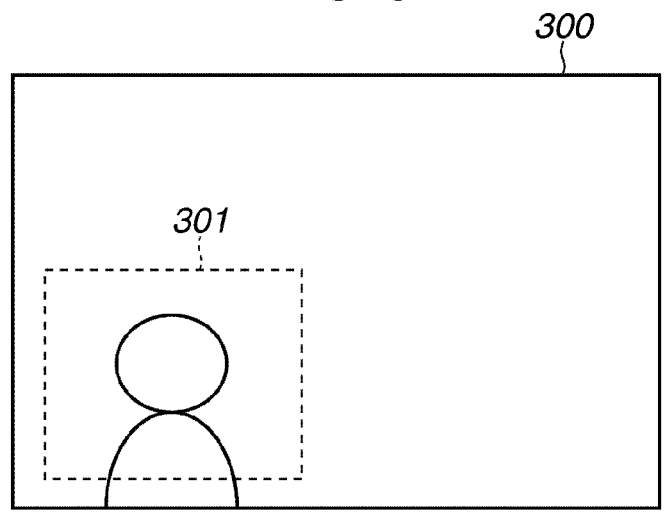
FIG. 3 illustrates a cropping processing target image and a cropping region designation frame displayed on a display unit of the imaging apparatus.

When an image is selected, as illustrated in FIG. 3, the system control unit 130 displays the cropping processing target image 300 selected in step S206 and a cropping region designation frame 301 on the display unit 107. When the user arbitrarily selects the cropping region by changing the size and position of the cropping region designation frame 301 on the display unit 107, in step S207, the system control unit 130 detects the selection of the cropping region. When the cropping region is selected, in step S208, the system control unit 130 executes cropping processing by the image processing unit 113.

Figure 4:
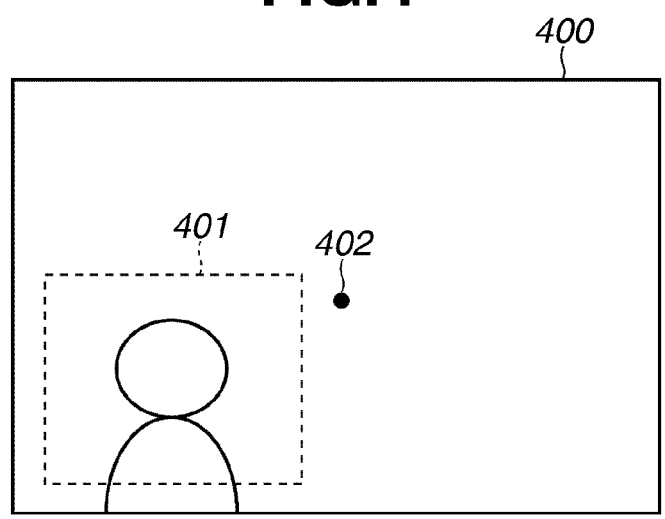
FIG. 4 illustrates the image before and after cropping in the cropping processing and a center position of the image before the cropping processing is performed, which are displayed on the display unit of the imaging apparatus.

For example, as illustrated in FIG. 4, a pre-cropping processing image 400 (i.e., original image before cropping processing is not performed) is cropped by the user to a region indicated by a cropping region designation frame 401. In the present exemplary embodiment, the image 400 before cropping processing is performed (hereinafter, sometimes referred to as "pre-cropping processing image 400"), the region indicated by the cropping region designation frame 401 (hereinafter, sometimes referred to as "post-cropping processing image 401"), and a center position 402 of the pre-cropping processing image respectively have the coordinates and size indicated below.

In the image 400, an image height reference position, which is the position of a point of an optical image formed on the image sensor by light passing through a position, which is the center of radially changing optical characteristics of the imaging lens 100, is assumed to coincide with the center position 402 of the image. However, the size of the pre-cropping processing image, the size of the post-cropping processing image, the cropping position, the image height reference position and the like are not limited to the above.

<Concerning the Pre-Cropping Processing Image>
Number of Horizontal Pixels: 300 Pixels
Number of Vertical Pixels: 200 Pixels The center coordinates of the pre-cropping processing image 400 when the upper left coordinates of the pre-cropping processing image 400 are an origin (0, 0) is (150, 100).

<Concerning the Post-Cropping Processing Image>
Number of Horizontal Pixels: 120 Pixels
Number of Vertical Pixels: 80 Pixels The upper left coordinates of the post-cropping processing image 401 when the upper left coordinates of the pre-cropping processing image 400 is the origin (0, 0) are (20, 80).

Concerning the coordinates (horizontal coordinate, vertical coordinate) described in the present exemplary embodiment, for the horizontal coordinate, all of the coordinates are written so that right side indicates a plus direction and left side indicates a minus direction with respect to the origin (0, 0). Further, for the vertical coordinate, all of the coordinates are written so that down side indicates a plus direction and up side indicates a minus direction with respect to the origin (0, 0).

When subsequently performing the optical distortion correction on the image, information for determining the image height reference position of the pre-cropping processing image 400, which corresponds to the post-cropping processing image 401, is required. Therefore, in step S209, when performing the cropping processing, the system control unit 130 calculates the reference position information (information for determining the image height reference position) of the pre-cropping processing image 400, and in step S210, adds this reference position information to the image.

The reference position information of the pre-cropping processing image 400 is recorded, for example, in the form of the reference position information coordinates of the pre-cropping processing image 400 when the upper left coordinates of the post-cropping processing image 401 are the origin (0, 0).

According to this form, the reference position information of the pre-cropping processing image 400, corresponding to the post-cropping processing image 401, is (130, 20). The coordinates of the origin (0, 0) are not limited to the upper left coordinates of the post-cropping processing image 401. Arbitrary coordinates may be used as the origin (0, 0).

The reference position information of the pre-cropping processing image 400 may be recorded in the form of the upper left coordinates of the post-cropping processing image 401 when the center position 402 of the pre-cropping processing image 400 is the origin (0, 0).

According to this form, the reference position information of the pre-cropping processing image 400, corresponding to the post-cropping processing image 401, is (−130, −20). Further, the coordinates of the origin (0, 0) are not limited to the center position coordinates of the pre-cropping processing image 400. Any coordinates may be used as the origin (0, 0).

Further, the reference position information of the pre-cropping processing image 400 is not limited to the above-described form.

Subsequently, in step S211, the system control unit 130 writes the post-cropping processing image 401, to which the reference position information of the pre-cropping processing image 400 is added (recorded), back into the external storage device 112. Then, the cropping processing ends.

Here, in the cropping processing of the present exemplary embodiment, while a case is described where the cropping is performed on the image having been captured by the user, the present invention is not limited to this. For example, even when recording an image that has already been cropped, like in the electronic zoom function, by similarly adding (recording) the reference position information of the image to the image, the reference position information of the image may be utilized when subsequently performing optical distortion correction on the image.

To summarize, in the present exemplary embodiment, information for determining a specific position of the pre-cropping processing image is added and recorded in the cropped image. Further, information for calculating a distance from the specific position of the pre-cropping processing image to each pixel of the cropped image is added to the cropped image.

The information for calculating this distance is the size per pixel of the image sensor 103. The information for determining the specific position of the pre-cropping processing image includes the image size of the pre-cropping processing image, the image size of the post-cropping processing image, and the coordinates of the post-cropping processing image corresponding to the pre-cropping processing image.

When the cropping processing by the image processing unit 113 is finished, in step S234, the system control unit 130 determines whether the user has instructed the display of the image processing selection menu to finish. If the user has not instructed the display of the image processing selection menu to finish (NO in step S234), the processing returns to step S200. In step S200, the system control unit 130 again displays the image processing selection menu on the display unit 107, and waits for selection of the next image processing via the image processing selection menu by the user. If the user has instructed the display of the image processing selection menu to finish (YES in step S234), the processing ends.

Next, a case where rotation processing is selected by the user will be described. When the user selects rotation processing via the image processing selection menu, the system control unit 130 detects the selection of rotation processing (YES in step S202), and in step S232, the image processing unit 113 executes the rotation processing illustrated in FIG. 2C.

In the rotation processing, when the user performs a predetermined operation via the operation unit 124, in step S212, the system control unit 130 successively reads the images recorded in the external storage device 112 into the image display memory 109, and displays each image on the display unit 107. Next, in step S213, when the user performs a predetermined operation via the operation unit 124 to select a rotation processing target image, the system control unit 130 detects the selected image. Examples of selectable images include JPEG images, RAW images and the like.

When the image is selected, the system control unit 130 displays a rotation amount selection menu (not-illustrated) for the selected image on the display unit 107. In step S214, when the user has input (selected) a rotation angle for the image via the rotation amount selection menu, the system control unit 130 detects the rotation angle of the selected image. For this rotation angle of the image, an arbitrary rotation angle of from −359° to +359° can be selected.

Figure 5:
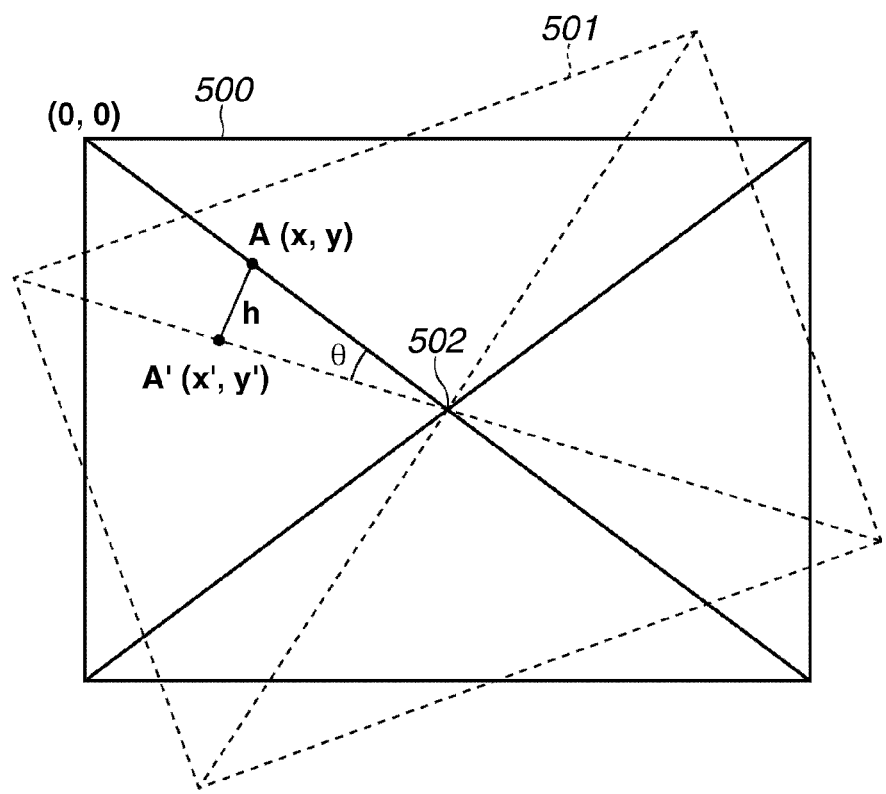
FIG. 5 illustrates the image before and after rotation in the rotation processing.

FIG. 5 illustrates the images before and after rotation in the rotation processing when the rotation angle $\theta=-359°$ to +359°. In FIG. 5, an image 500 before cropping processing is performed (hereinafter, sometimes referred to as "pre-rotation processing image 500") is represented by a solid line, an image 501 (hereinafter, sometimes referred to as "post-rotation processing image 501") is represented by a dotted line. FIG. 5 also illustrates an image center (rotation axis) 502.

A rotation processing method of the image will now be described using an example in which a pixel A of the pre-rotation processing image 500 undergoes coordinate conversion into a pixel A' of the post-rotation processing image 501. Unless stated otherwise, the coordinates, which is used in the following rotation processing description, employs the upper left pixel coordinates of the pre-rotation processing image 500 as the origin (0, 0).

If the coordinates of pixel A of the pre-rotation processing image 500 are (x, y), the coordinates of pixel A' of the post-rotation processing image 501 are (x', y'), the distance connecting the pixel A and the pixel A' in a straight line is h, and the coordinates of the image center (rotation axis) 502 are (a, b), then the following expressions hold.

$$h=2\times\{((a-x)^2+(b-x)^2)^{0.5}\}\times\sin(\theta/2)$$

$$x'=x-h\times\sin\theta$$

$$y'=y+h\times\cos\theta \qquad \text{equation 1}$$

Figure 6:
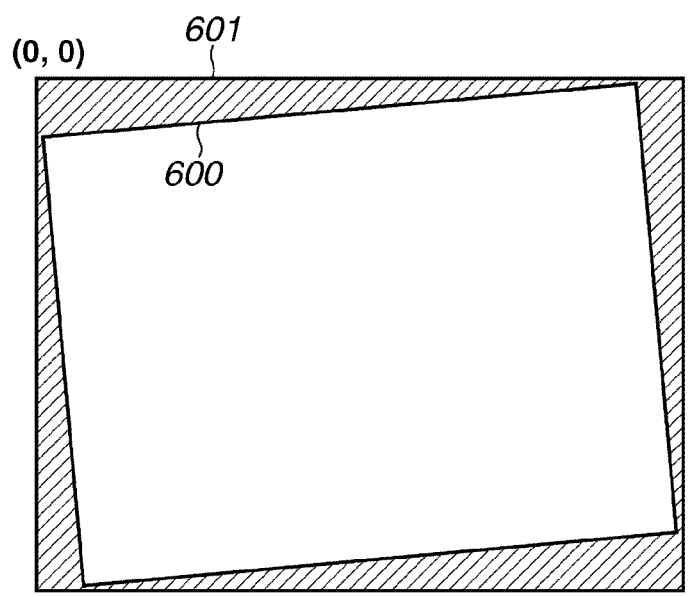
FIG. 6 illustrates image pixel adding processing for keeping the rotated image horizontal in the rotation processing.

In step S215, the system control unit 130, using equation 1, performs coordinate conversion on all of the pixels of the pre-rotation processing image, and executes the rotation processing. As illustrated in FIG. 6, by performing the rotation processing, a post-rotation processing image 600 is inclined, so that to keep the post-rotation processing image 600 horizontal, an image 601 is produced in which portions with no data are filled in with black, white etc. As a result, the image can be displayed on other display devices as well as the display unit 107.

In the present exemplary embodiment, as illustrated in FIG. 6, the image is kept horizontal by filling in the portions, which have no data, with black or white. However, the image may be kept horizontal by cropping the inner side of the post-rotation processing image in a rectangular shape or a square shape.

For the image that has thus been subjected to rotation processing, the rotation axis and the center position of the image are not changed. Therefore, the reference position information embedded in the image may be used even when subsequently performing optical distortion correction on the image.

However, when rotating an image which has already undergone cropping processing, the rotation axis and the image height reference position (the image height reference position before performing the cropping processing) to be used for the optical distortion correction are not necessarily coincident. Thus, the reference position information recorded in the image has to be converted into the reference position information after rotation processing.

Figure 7:
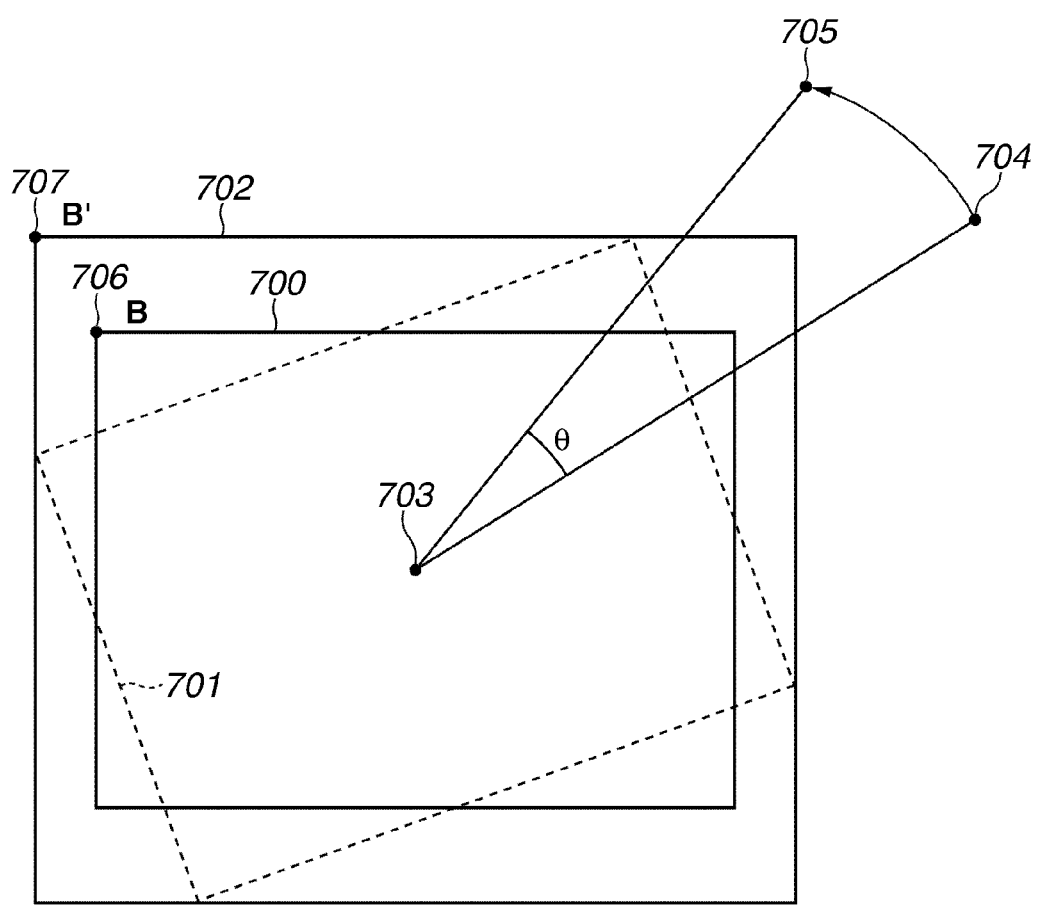
FIG. 7 illustrates coordinate conversion processing of the center coordinates of before the rotation processing is performed in the rotation processing.

A method for converting the reference position information will be described referring to FIG. 7. FIG. 7 illustrates coordinate conversion processing of the center coordinates of the pre-rotation processing image in the rotation processing. FIG. 7 includes a pre-rotation processing image 700, a post-rotation processing image 701 when the rotation angle is θ, a filled in image 702 which has undergone processing for keeping the post-rotation processing image horizontal, and a rotation axis 703.

FIG. 7 also includes an image height reference position 704 which is indicated by the reference position information recorded in the pre-rotation processing image, an image height reference position 705 which is indicated by the reference position information recorded in the post-rotation processing image, an origin 706 (B) (pixel B) with coordinates corresponding to the pre-rotation processing image height reference position 704, and an origin 707 (pixel B') with coordinates corresponding to the post-rotation processing image height reference position 705.

The pre-rotation processing image height reference position 704 calculated using the pre-rotation processing image height information recorded in the pre-rotation processing image 700 has coordinates (X,Y). These coordinates (X,Y) of the pre-rotation processing image height reference position 704 are coordinates with the upper left pixel B 706 of the pre-rotation processing image as the origin (0, 0).

First, the pre-rotation processing image height reference position coordinates are converted using the above equation 1 into coordinates (X', Y') of the post-rotation processing image height reference position 705. Further, as illustrated in FIG. 6, in step S216, after the rotation processing of the image, to keep the image horizontal, the surrounding pixels are filled in to convert into an image that can be kept horizontal. Then, in step S217, the system control unit 130 converts the coordinates (X', Y') into coordinates (X", Y") in which the upper left pixel 707 of the filled-in image (post-rotation processing image) 702 is the origin (0, 0). Namely, the pre-rotation processing reference position information is calculated.

In step S218, the system control unit 130 adds to the image the reference position information calculated as described above and originally recorded in the pre-rotation processing image 700, in which the upper left pixel 707 of the post-rotation processing image 702 is the origin (0, 0) (re-records in the image).

Thus, by always setting the upper left pixel of the post-rotation processing image 702 as the origin (0, 0), and defining the above-described reference position information, correct reference position information can be calculated without having to consider in the subsequent optical distortion correction processing whether the image is subjected to the rotation processing.

In the present exemplary embodiment, while the upper left pixel of the post-rotation processing image is the origin (0, 0), some other coordinates may also be used as the origin. In such a case, which coordinates are set as the origin may be defined in advance also when performing the optical distortion correction processing.

Subsequently, in step S219, the system control unit 130 rewrites the image which underwent the above-described rotation processing in the external storage device 112. Then, the rotation processing ends.

To summarize, in the present exemplary embodiment, information for determining a specific position of the pre-rotation processing image is added and recorded in the rotated image. Further, information for calculating a distance from the specific position of the pre-rotation processing image to each pixel of the rotated image is added to the rotated image. The information for calculating this distance is the size per pixel of the image sensor 103.

When the rotation processing by the image processing unit 113 is finished, in step S234, the system control unit 130 determines whether the user has instructed to finish the display of the image processing selection menu. If the user has not instructed to finish the display of the image processing selection menu (NO in step S234), the processing returns to step S200. In step S200, the system control unit 130 again displays the image processing selection menu on the display unit 107, and waits for selection of the next image processing via the image processing selection menu by the user. If the user has instructed to finish the display of the image processing selection menu (YES in step S234), the present processing ends.

Next, a case where variable magnification processing is selected by the user will be described. When the user selects variable magnification processing from the image processing selection menu, the system control unit 130 detects the selection of variable magnification processing (YES in step S203), and in step S233, the image processing unit 113 executes the variable magnification processing illustrated in FIG. 2D.

In the variable magnification processing, when the user performs a predetermined operation via the operation unit 124, in step S220, the system control unit 130 successively reads the images recorded in the external storage device 112 into the image display memory 109, and displays each image on the display unit 107.

Next, in step S221, when the user performs a predetermined operation via the operation unit 124 to select a variable magnification processing target image, the system control unit 130 detects the selected image. Examples of selectable images include JPEG images, RAW images and the like.

When the image is selected, the system control unit 130 displays a magnification ratio selection menu (not-illustrated) for the selected image on the display unit 107. In the magnification ratio selection menu, the magnification ratio of the image can be arbitrary selected to either enlarging (magnification ratio of 1 or more) or reducing (magnification ratio of less than 1).

When the user designates the magnification ratio of N times from the magnification ratio selection menu, in step S222, the system control unit 130 detects the designation of the magnification ratio. In step S223, the image processing unit 113 executes the variable magnification processing. The variable magnification processing is performed while interpolating the image using a commonly known bilinear method or bicubic method.

Next, in step S224, the system control unit 130 calculates the total magnification ratio information (information indicating the magnification ratio) indicating the final magnification ratio in the above-executed variable magnification processing. In step S225, the system control unit 130 adds the total magnification ratio information to the image. The image to which the total magnification ratio information is added (recorded) is subsequently used when the optical distortion correction is performed. Further, if the variable magnification processing is not performed, a magnification ratio of 1 is recorded in the image as the magnification ratio information.

Subsequently, in step S226, the system control unit 130 writes the image which has undergone the above-described variable magnification processing back into the external storage device 112, and the variable magnification processing ends.

When the variable magnification processing by the image processing unit 113 is finished, in step S234, the system control unit 130 determines whether the user has instructed to finish the display of the image processing selection menu. If the user has not instructed to finish the display of the image processing selection menu (NO in step S234), the processing returns to step S200. In step S200, the system control unit 130 again displays the image processing selection menu on the display unit 107, and waits for selection of the next image processing via the image processing selection menu by the user. In the present exemplary embodiment, since the cropping processing, the rotation processing, and the variable magnification processing are all finished (YES in step S234), the present processing ends.

The image height reference position is the point where light has passed through the center of the radially changing optical characteristics of the imaging lens 100 in the optical image formed on the image sensor 103 by light passing through the imaging lens 100. Therefore, if the position of the imaging lens 100 changes with respect to the image sensor 103, the image height reference position also changes. Consequently, to prevent image blur, when an image stabilization mechanism is provided, which shifts the imaging lens 100 or the image sensor 103 in a direction orthogonal to the light axis, the image height reference position may also be shifted from the center position 402 of the image based on this shift amount.

Next, a method for performing the optical distortion correction processing on an image that has been subjected to image processing will be described referring to the flowchart illustrated in FIG. 8.

Examples of the optical distortion correction described in the present exemplary embodiment include lateral chromatic aberration correction, distortion aberration correction, and light-falloff-at-edges correction. First, before describing the optical distortion correction processing illustrated in FIG. 8, what processing is performed for the correction of lateral chromatic aberration, the distortion aberration correction, and the light-falloff-at-edges correction respectively will be described.

Chromatic aberration of magnification occurs because the incident position of the target light is different with respect to the imaging optical system of the imaging apparatus due to the wavelength of the light. Therefore, by correcting the position of the R channel and B channel pixels among the R channel, G channel, and B channel corresponding respectively to the color filters (R, G, B) constituting the image sensor 103, the lateral chromatic aberration can be corrected.

Figure 9:
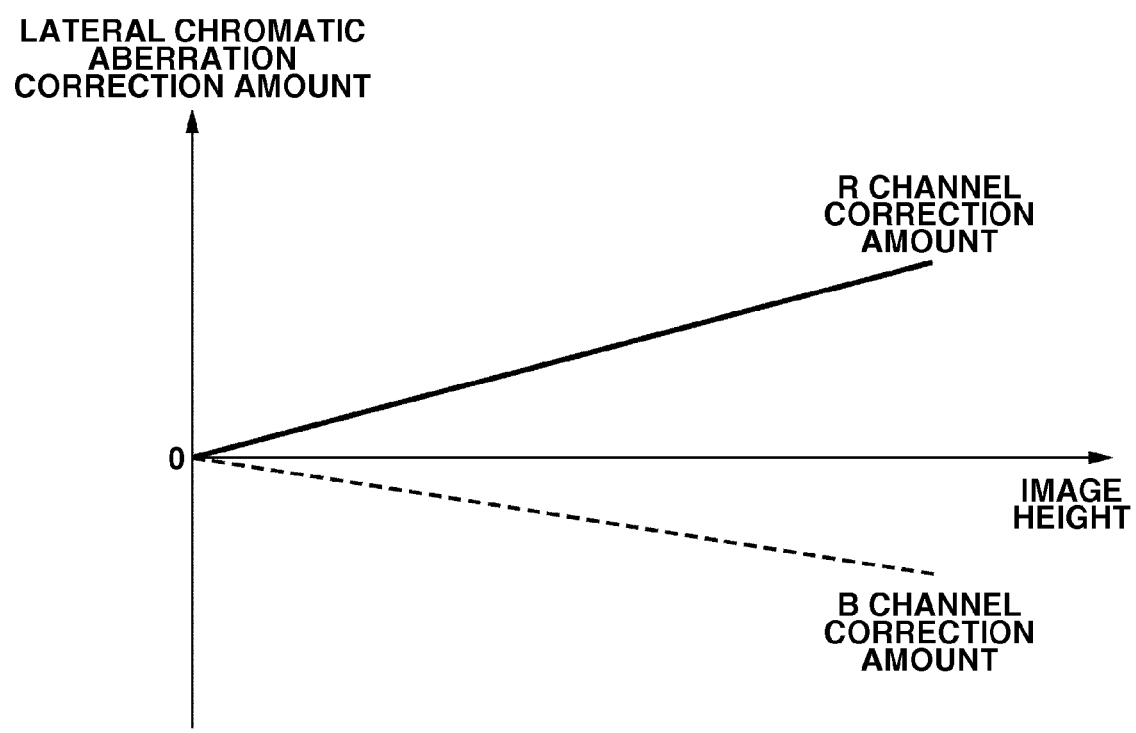
FIG. 9 illustrates a correction amount of lateral chromatic aberration with respect to image height.

In the lateral chromatic aberration correction, the correction amounts for the R channel and the B channel have to be changed based on the image height. FIG. 9 illustrates a graph of simplified lateral chromatic aberration correction amounts with respect to image height. In FIG. 9, the solid line illustrates the correction amount for the R channel, and the dotted line illustrates the correction amount for the B channel.

The coordinate positions of the R channel and B channel pixels are changed based on the correction amount illustrated in FIG. 9. For example, if the R channel coordinates of a given pixel A before correction in the image are (Rx, Ry), the R channel coordinates after correction are (Rx×α, Ry×α).

Similarly, if the B channel coordinates of the given pixel A before correction in the image are (Bx, By), the B channel coordinates after correction are (Bx×β, By×β). Here, α=the lateral chromatic aberration correction amount of the R channel for the image height corresponding to coordinates A, and β=the lateral chromatic aberration correction amount of the B channel for the image height corresponding to coordinates A.

If the R channel and B channel information of some pixels is lost due to the lateral chromatic aberration correction, such information is interpolated using the above-described bilinear method or the like from the R channel and B channel information of adjacent pixels. Thus, to correct lateral chromatic aberration, the image height of the correction target pixel needs to be calculated.

In the present embodiment, while the lateral chromatic aberration correction amount is illustrated in the graph in FIG. 9. Practically, the lateral chromatic aberration correction is performed by using the table in the image processing unit 113 (chromatic aberration correction apparatus of magnification) in which data converted from the graph in FIG. 9 is stored.

Alternatively, the lateral chromatic aberration correction may be performed by recording the graph in FIG. 9 in the image processing unit 113 so that values of the graph can be calculated using an approximation method. In addition, since practically the table for the lateral chromatic aberration correction differs depending on the type of imaging lens, the focal length and the like, the correction value for each imaging lens and focal length must be recorded in the image processing unit 113.

Figure 10:
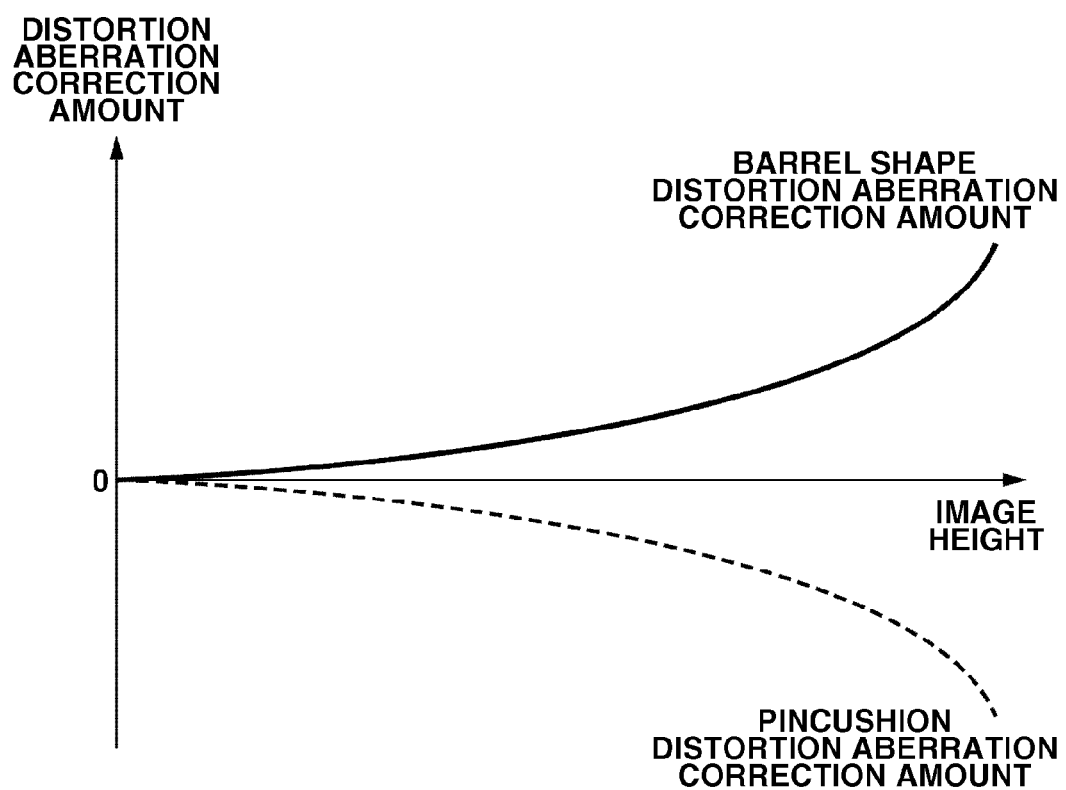
FIG. 10 illustrates a correction amount of distortion aberration correction with respect to image height.

In the distortion aberration correction, like with the other optical distortion corrections described in the present exemplary embodiment, the correction amount differs depending on the image height. FIG. 10 illustrates a graph of simplified distortion aberration correction amounts with respect to image height. In FIG. 10, the solid line illustrates the correction amount for commonly known barrel-shape distortion aberration correction, and the dotted line illustrates the correction amount for pincushion distortion aberration correction.

The coordinate position of each pixel is changed based on the correction amount illustrated in FIG. 10. For example, if the coordinates of a given pixel "a" before correction in the image are (Xa, Ya), the coordinates after the distortion aberration correction are (Xa×γ, Ya×γ). Here, γ=the distortion aberration correction amount for the image height corresponding to coordinates "a".

If the information of pixels is lost due to the distortion aberration correction, such information is interpolated using the above-described bilinear method or the like from each of the R, G, B channels of an adjacent pixel. Thus, to correct distortion aberration, the image height of the correction target pixel needs to be calculated.

In the present embodiment, while the distortion aberration correction amount is illustrated in the graph in FIG. 10, practically the distortion aberration correction is performed by using the table in the image processing unit 113 (distortion aberration correction apparatus) in which data is stored that is converted from the graph in FIG. 10.

Alternatively, the distortion aberration correction may be performed by recording data in the image processing unit 113 so that the graph in FIG. 10 can be calculated using an approximation method. In addition, since practically the table for the distortion aberration correction differs depending on the type of imaging lens, the focal length and the like, the correction value for each imaging lens and focal length must be recorded in the image processing unit 113.

Figure 11:
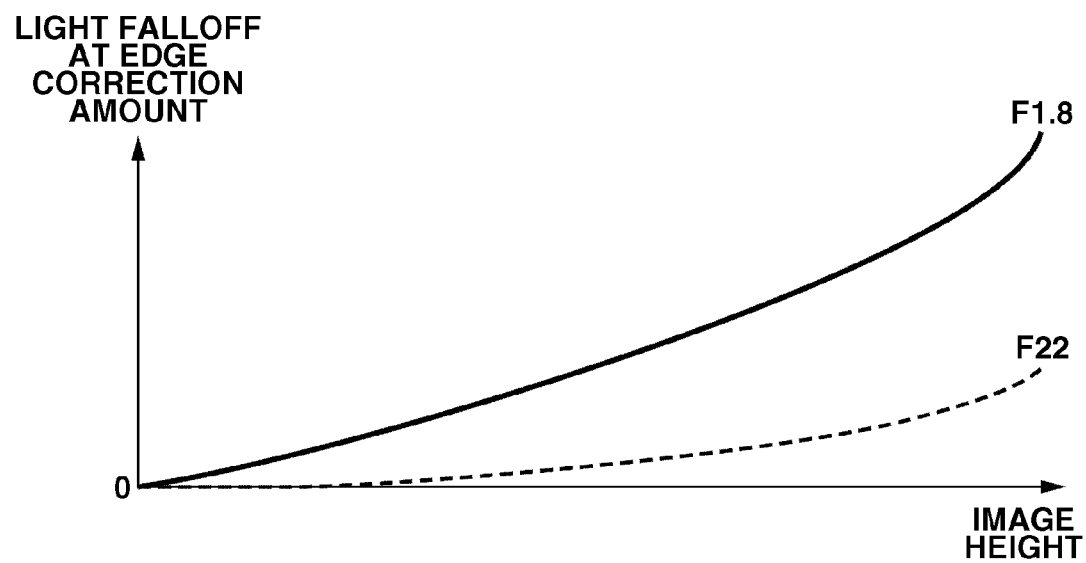
FIG. 11 illustrates a correction amount of light-falloff-at-edges correction with respect to image height.

Light falloff at edges is a phenomenon in which the amount of light decreases as a position of the imaging lens is farther from the center thereof. In the light-falloff-at-edges correction, like with the other optical distortion corrections described in the present exemplary embodiment, the correction amount changes depending on the image height. FIG. 11 illustrates a graph of simplified light-falloff-at-edges correction amounts with respect to image height. In FIG. 11, the solid line illustrates the correction amount when an imaging lens diaphragm is at F 1.8, and the dotted line illustrates the correction amount when a diaphragm is at F 22.

As illustrated in FIG. 11, the more the diaphragm is on the open side, the greater the light falloff at edges is. Therefore, the light-falloff-at-edges correction amount must also be increased according to the light falloff amount. The light-falloff-at-edges correction may be performed by performing correction on each pixel in each of the R, G, B channels based on the correction table in FIG. 11.

For example, if R, G, B values of a given pixel "b" before correction in an image captured at a diaphragm of F 1.8 are (Rb, Gb, Bb), the R, G, B values after the light-falloff-at-edges correction are (Rb×μ, Gb×μ, Bb×μ). Here, μ=the light-falloff-at-edges correction amount for the image height at a diaphragm of F 1.8 corresponding to coordinates "b". Thus, to correct light falloff at edges, the image height of the correction target pixel needs to be calculated.

In the present embodiment, while the light-falloff-at-edges correction amount is illustrated in the graph in FIG. 11, practically the light-falloff-at-edges correction is performed by using the table in the image processing unit 113 (light falloff at edge correction apparatus) in which data is stored that is converted from the graph in FIG. 11.

Alternatively, the light falloff at edge correction may be performed by recording data in the image processing unit 113 so that the graph in FIG. 10 can be calculated using an approximation method. In addition, since practically the table for the light-falloff-at-edges correction differs depending on the type of imaging lens, the focal length, the diaphragm and the like, the correction value for each imaging lens, focal length, and diaphragm must be recorded in the image processing unit 113.

Thus, it can be seen that to perform the optical distortion correction (lateral chromatic aberration correction, distortion aberration correction, and light-falloff-at-edges correction), information for calculating the image heights is necessary. This optical distortion correction processing will now be described referring to a flowchart illustrated in FIG. 8.

Figure 8:
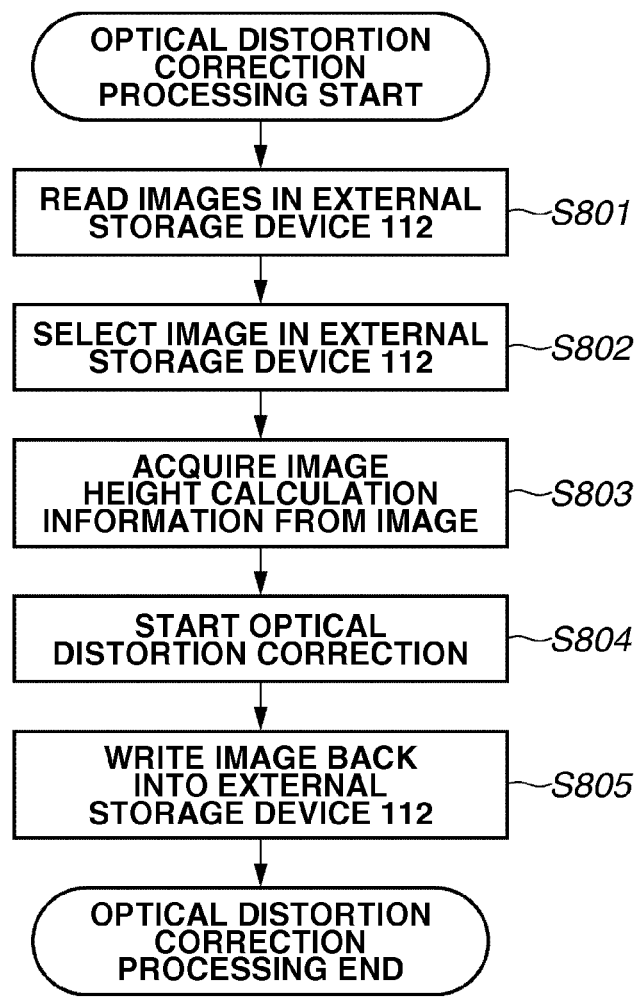
FIG. 8 is a flowchart illustrating optical distortion correction processing by the imaging apparatus.

FIG. 8 is a flowchart illustrating the optical distortion correction processing for the imaging apparatus.

In FIG. 8, when the user performs a predetermined operation via the operation unit 124, in step S801, the system control unit 130 successively reads the images recorded in the external storage device 112 into the image display memory 109, and displays each image on the display unit 107. Next, in step S802, when the user selects an optical distortion correction processing target image using the operation unit 124, the system control unit 130 detects the selected image. Examples of selectable images include JPEG images, RAW images and the like.

When an image is selected, in S803, the system control unit 130 acquires the image height calculation information required for the optical distortion correction processing which is recorded in the image in advance. Examples of the image height calculation information include reference position information (pre-cropping processing or pre-rotation processing reference position information), information on the imaging apparatus model, and pixel pitch information and magnification ratio information of the image sensor embedded in the captured image.

Instead of the pixel pitch information, if the model information of the imaging apparatus is embedded in the image, the system control unit 130 records in advance the pixel pitch information corresponding to the information of a plurality of models in the nonvolatile memory 122. When performing the optical distortion correction processing, the pixel pitch information corresponding to the model information read from the image is read from the nonvolatile memory 122.

Using the image height calculation information, the optical distortion correction processing (lateral chromatic aberration correction processing, distortion aberration correction processing, and light-falloff-at-edges correction processing) is performed on each pixel of the image. The image height H (i, j) corresponding to each pixel of the image can be calculated by the following equation 2.

$$\text{Image height } H(i,j) = \{\{(Xc-i)^2 + (Xc-i)^2\} \times 0.5\} \times P \times T \quad \text{equation 2}$$

Here:
(i, j)=Coordinates of the pixel on which image correction processing is performed, when the upper left pixel of the image before the optical distortion correction is set as the origin
P=Pixel pitch.
T=Magnification ratio.
(Xc, Yc)=Center coordinates of the pre-cropping and pre-rotation image, when the upper left pixel of the image before optical distortion correction as the origin.

In step S804, the system control unit 130 uses the image height information calculated based on equation 2 to perform the optical distortion correction processing (lateral chromatic aberration correction processing, distortion aberration correction processing, and light-falloff-at-edges correction processing). Although the present exemplary embodiment is configured so that the chromatic aberration correction of magnification processing, distortion aberration correction processing, and light-falloff-at-edges correction processing are all performed, the present invention is not limited to this. In another configuration, a user may perform only the necessary correction processing selected from among the lateral chromatic aberration correction processing, distortion aberration correction processing, and light-falloff-at-edges correction processing.

Subsequently, in step S805, the system control unit 130 writes the image which has been subjected to the optical distortion correction processing back into the external storage device 112, and the optical distortion correction processing ends.

Thus, according to the present exemplary embodiment, the system control unit 130 adds the reference position information for determining the specific position of the pre-cropping processing image to the image on which the cropping processing has been performed, and records that image in the external storage device 112. Further, the system control unit 130 adds the reference position information for determining the specific position of the pre-rotation processing image to the image on which the rotation processing has been performed, and records that image in the external storage device 112. Further, the system control unit 130 adds to the image information (pixel pitch information) indicating the pixel size per pixel of the image sensor 103.

Therefore, using the reference position information and the pixel pitch information, the image height corresponding to each of the pixels of the image on which optical distortion correction (lateral chromatic aberration correction, distortion aberration correction, and light-falloff-at-edges correction) is to be performed can be calculated even for images which have undergone cropping processing and rotation processing. As a result, optical distortion correction can be correctly performed even on images that have undergone cropping processing and rotation processing.

In the present exemplary embodiment, while an example is described in which the cropping processing, the rotation processing, the variable magnification processing, and the optical distortion correction processing are performed in the imaging apparatus, the present invention is not limited to this.

For example, part or all of each of the processing may be performed by an application software program installed in a PC as an information processing apparatus.

An example of such a configuration is to perform the cropping processing, rotation processing, and variable magnification processing on the PC using the application software program, and perform the optical distortion correction processing with the imaging apparatus. Another example of such a configuration is to perform the cropping processing, rotation processing, and variable magnification processing with the imaging apparatus, and perform the optical distortion correction processing on the PC with the application software program.

Figure 12:
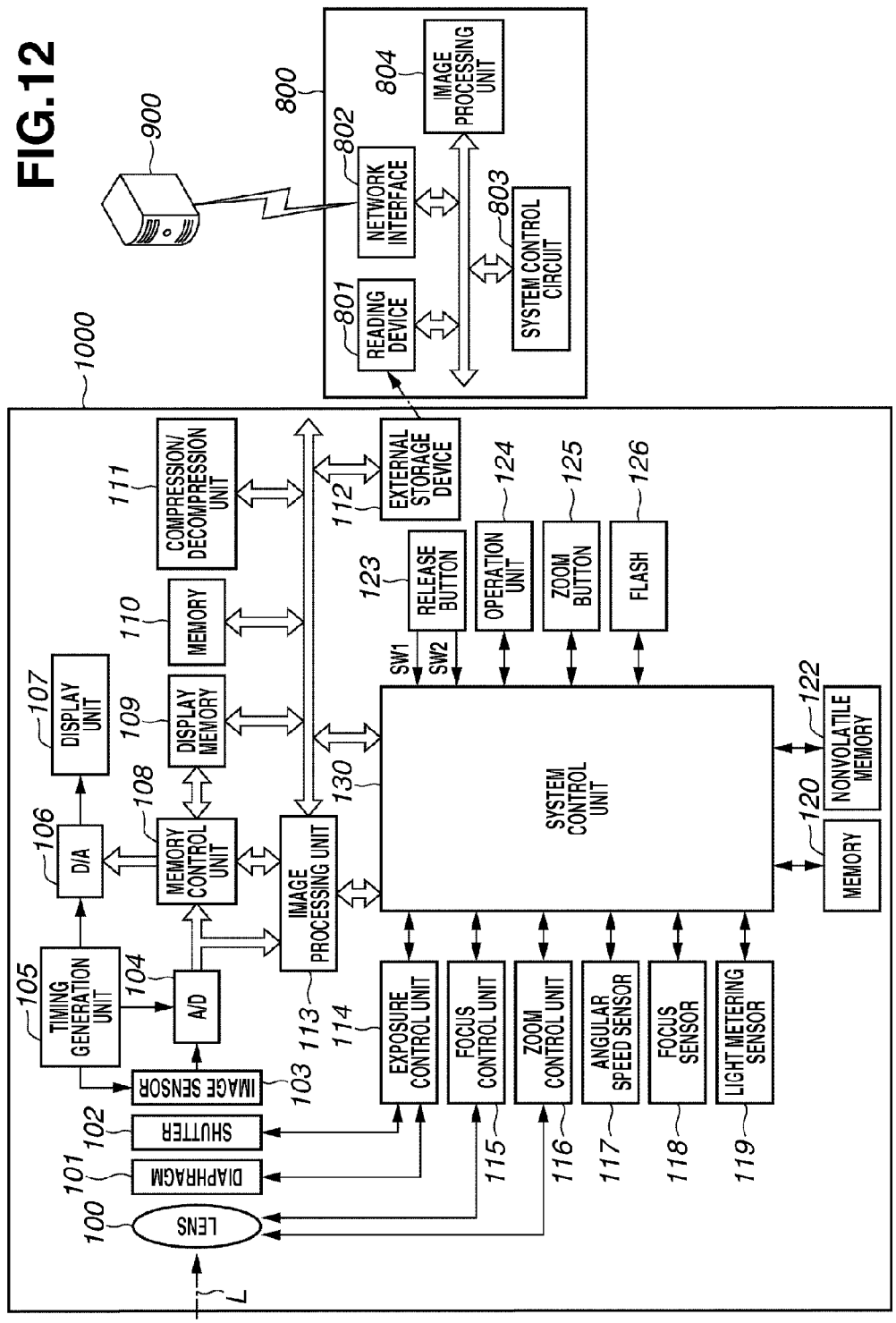
FIG. 12 is a block diagram illustrating a configuration of an image processing system according to another exemplary embodiment of the present invention.

FIG. 12 is a block diagram illustrating a configuration example as an image system in which the cropping processing, rotation processing, and variable magnification processing are performed with the imaging apparatus, and the optical distortion correction processing is performed on the PC with an application software program.

This imaging system includes an imaging lens 1000, which has the similar configuration to the imaging lens illustrated in FIG. 1, a computer 800, and a server 900. The computer 800 includes a reading device 801, a network interface 802, a system control circuit 803, and an image processing unit 804.

The reading device 801 reads the image on which the cropping processing, rotation processing, or variable magnification processing is performed, and the reference position information added to that image. The network interface 802 receives from the server 900 the image on which the cropping processing, rotation processing, or variable magnification processing is performed, and the reference position information added to that image.

The system control circuit 803 is responsible for the overall control of the computer 800. The image processing unit 804 performs the optical distortion correction processing using the image and the reference position information obtained via the reading device 801 or the network interface 802.

Further, all of the cropping processing, the rotation processing, the variable magnification, and the optical distortion correction processing may be performed on a PC by an application software program.

The present invention may also be achieved by supplying a storage medium, on which the software program code for realizing the functions of the above exemplary embodiment is stored, to a system or an apparatus, and having a computer (or a central processing unit (CPU) or a micro processing unit (MPU)) of the system or apparatus read the program code stored on the storage medium.

In this case, the program code itself read from the storage medium realizes the functions of the above-described exemplary embodiment, so that the program code and the storage medium which store the program code constitute the present invention.

Examples of storage media for supplying the program code include a floppy disk, a hard disk, a magneto-optical disk, a compact disc read only memory (CD-ROM), a CD recordable (CD-R), a CD-rewritable (CD-RW), a digital versatile disk ROM (DVD-ROM), a DVD random access memory (DVD-RAM), a DVD-RW, a DVD+RW, a magnetic tape, a nonvolatile memory card, a ROM and the like. Further, the program code may also be downloaded via a network.

Further, the present invention also includes cases where the computer executes the read program code, and thereby the functions of the above-described exemplary embodiment are realized. In addition, the present invention also includes cases where, for example, based on an instruction from that program code, an operating system (OS) or the like running on the computer performs part or all of the actual processing, and thereby the functions of the above-described exemplary embodiment are realized.

Further, the present invention also includes cases where the program code read from a storage medium is written into a memory of a function expansion board inserted into the computer or a function expansion unit connected to the computer. Then, based on an instruction from the program code, a CPU or the like provided on the function expansion board or function expansion unit performs part or all of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-144551 filed Jun. 2, 2008, which is hereby incorporated by reference herein in its entirety.

What is claimed is:

1. An image processing apparatus having an image sensor which converts light passing through a lens to create an image, the image processing apparatus capable of performing optical distortion correction processing on an image that has undergone at least one of cropping and rotation processing, the image processing apparatus comprising:
    an image processing unit configured to perform,
        (1) cropping processing on a part of a first image to generate a second image, and
        (2) rotation processing for rotating the second image to generate a third image;
    a control unit configured to,
        (3) record information indicating a position of a center of radially changing optical characteristics of the lens in the first image, with the second image, wherein the information indicates coordinates of the center of the radially changing optical characteristics of the lens in the first image when coordinates of a predetermined pixel of the second image is used as an origin, and
        (4) calculate coordinates of the center of the radially changing optical characteristics of the lens in the first image when coordinates of a predetermined pixel of the third image are used as an origin and record the calculated coordinates;
    an image height calculation unit configured to calculate image height information which includes an image height H corresponding to each pixel of either one of the second or third image; and
    a correction unit configured to perform at least one of chromatic aberration correction, distortion aberration correction and light-falloff-at-edges correction on either one of the second or third image, using the calculated image height information.

2. The image processing apparatus according to claim 1, wherein the image processing unit is configured to perform variable magnification processing for enlarging or reducing either one of the second or third image, and the control unit records information indicating a magnification ratio in the variable magnification processing performed on either one of the second or third image.

3. The image processing apparatus according to claim 1, wherein the image height H corresponding to each pixel of either the second or third image is calculated by the following equation:

$$\text{image height } H(i,j) = \{\{(Xc-i)^2 + (Xc-i)^2\} \times 0.5\} \times P \times T$$

where:
- (i, j)=coordinates of a pixel on which image correction processing is performed, when an upper left pixel of the image before the optical distortion correction is set as an origin;
- P=pixel pitch;
- T=magnification ratio; and
- (Xc, Yc)=center coordinates of the pre-cropping and pre-rotation image, when the upper left pixel of the image before optical distortion correction is used as the origin.

4. An image processing method for controlling an image processing apparatus having an image sensor which converts light passing through a lens to create an image, the image processing apparatus capable of performing optical distortion correction processing on an image that has undergone at least one of cropping and rotation processing, the method comprising:

via an image processing unit, performing,
(1) cropping processing on a part of a first image to generate a second image, and
(2) rotation processing for rotating the second image to generate a third image; and via a control unit, performing,
(3) recording information indicating a position of a center of radially changing optical characteristics of the lens in the first image, with the second image, wherein the information indicates coordinates of the center of the radially changing optical characteristics of the lens in the first image when coordinates of a predetermined pixel of the second image is used as an origin, and
(4) calculating coordinates of the center of the radially changing optical characteristics of the lens in the first image when coordinates of a predetermined pixel of the third image are used as an origin and record the calculated coordinates;

via an image height calculation unit, calculating image height information which includes an image height H corresponding to each pixel of either one of the second or third image; and via a correction unit, performing at least one of chromatic aberration correction, distortion aberration correction and light-falloff-at-edges correction on either one of the second or third image, using the calculated image height information.

5. The image processing method according to claim 4, further including performing variable magnification processing for enlarging or reducing either one of the second or third image, and recording information indicating a magnification ratio in the variable magnification processing performed on either one of the second or third image.

6. The method according to claim 4, wherein the image height H corresponding to each pixel of either the second or third image is calculated by the following equation:

$$\text{image height } H(i,j) = \{\{(Xc-i)^2 + (Xc-i)^2\} \times 0.5\} \times P \times T$$

where:
- (i, j)=coordinates of a pixel on which image correction processing is performed, when an upper left pixel of the image before the optical distortion correction is set as an origin;
- P=pixel pitch;
- T=magnification ratio; and
- (Xc, Yc)=center coordinates of the pre-cropping and pre-rotation image, when the upper left pixel of the image before optical distortion correction is used as the origin.

* * * * *